US005668899A

United States Patent [19]

Jadrich

[11] Patent Number: 5,668,899
[45] Date of Patent: Sep. 16, 1997

[54] OPTICAL RADIATION COUPLER FOR AN OPTICAL FIBER

[75] Inventor: Bradley S. Jadrich, Rochester, N.Y.

[73] Assignee: Eastman Kodak Company, Rochester, N.Y.

[21] Appl. No.: 638,899

[22] Filed: Apr. 24, 1996

[51] Int. Cl.⁶ ..................................................... G02B 6/32
[52] U.S. Cl. ............................................................ 385/33
[58] Field of Search ........................... 385/33, 39, 88–92, 385/147

[56] References Cited

U.S. PATENT DOCUMENTS

| | | | |
|---|---|---|---|
| 3,826,998 | 7/1974 | Kindl et al. | 331/94.5 C |
| 4,146,298 | 3/1979 | Szczepanel | 385/37 |
| 4,186,995 | 2/1980 | Schumacher | 385/88 |
| 4,432,601 | 2/1984 | Mannschke | 385/36 |
| 4,749,250 | 6/1988 | Carter | 350/96.2 |
| 4,840,457 | 6/1989 | Remer | 350/255 |
| 4,842,391 | 6/1989 | Kim et al. | 350/96.18 |
| 5,163,114 | 11/1992 | Hendow | 385/33 |
| 5,189,716 | 2/1993 | Matsubara et al. | 385/90 |
| 5,202,558 | 4/1993 | Barker | 250/227.21 |
| 5,208,888 | 5/1993 | Steinblatt et al. | 385/90 |
| 5,351,330 | 9/1994 | Jongewaard | 385/93 |

*Primary Examiner*—Akm E. Ullah
*Attorney, Agent, or Firm*—Nelson A. Blish

[57] ABSTRACT

Apparatus for coupling a radiation beam to an optical fiber includes an optical fiber holder, a housing, and a lens positioned in the housing. A flexure provides angular and longitudinal alignment of at least one of the lens and the optical fiber holder relative to the other of the lens and the optical fiber holder for thereby positioning and focusing of the beam on the radiation-receiving end of a received optical fiber. The flexure may be a thin, flat member with a first support region fixed relative to the lens and a second support region fixed relative to the fiber holder. The first and second support regions are circular and co-axial, and the second support region has diameter greater than the first region. The first and second support regions are connected by a plurality of flexible bridge pairs. The flexure holds the lens with three degrees of freedom of movement relative to the radiation-receiving end of the received optical fiber, including rotation about two axes plus translation along the optical path.

12 Claims, 8 Drawing Sheets

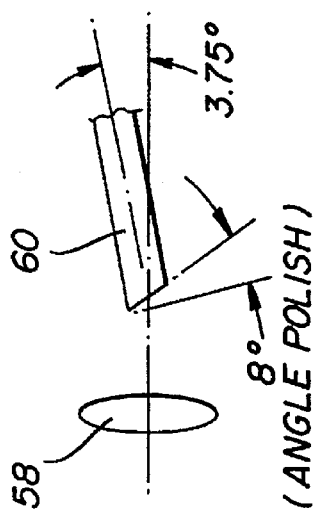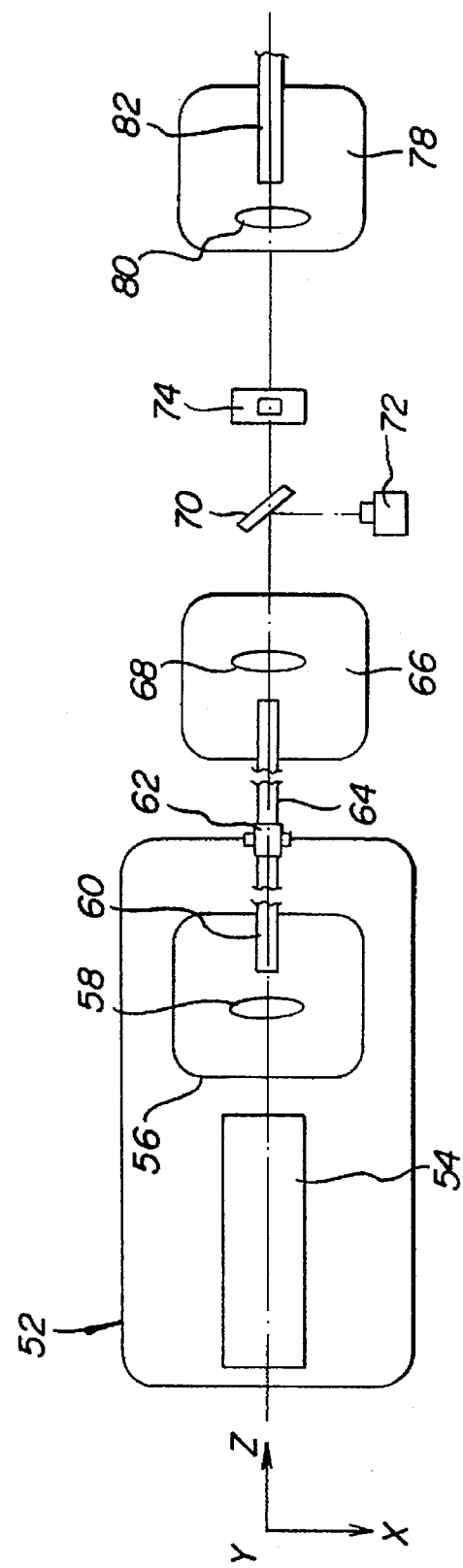

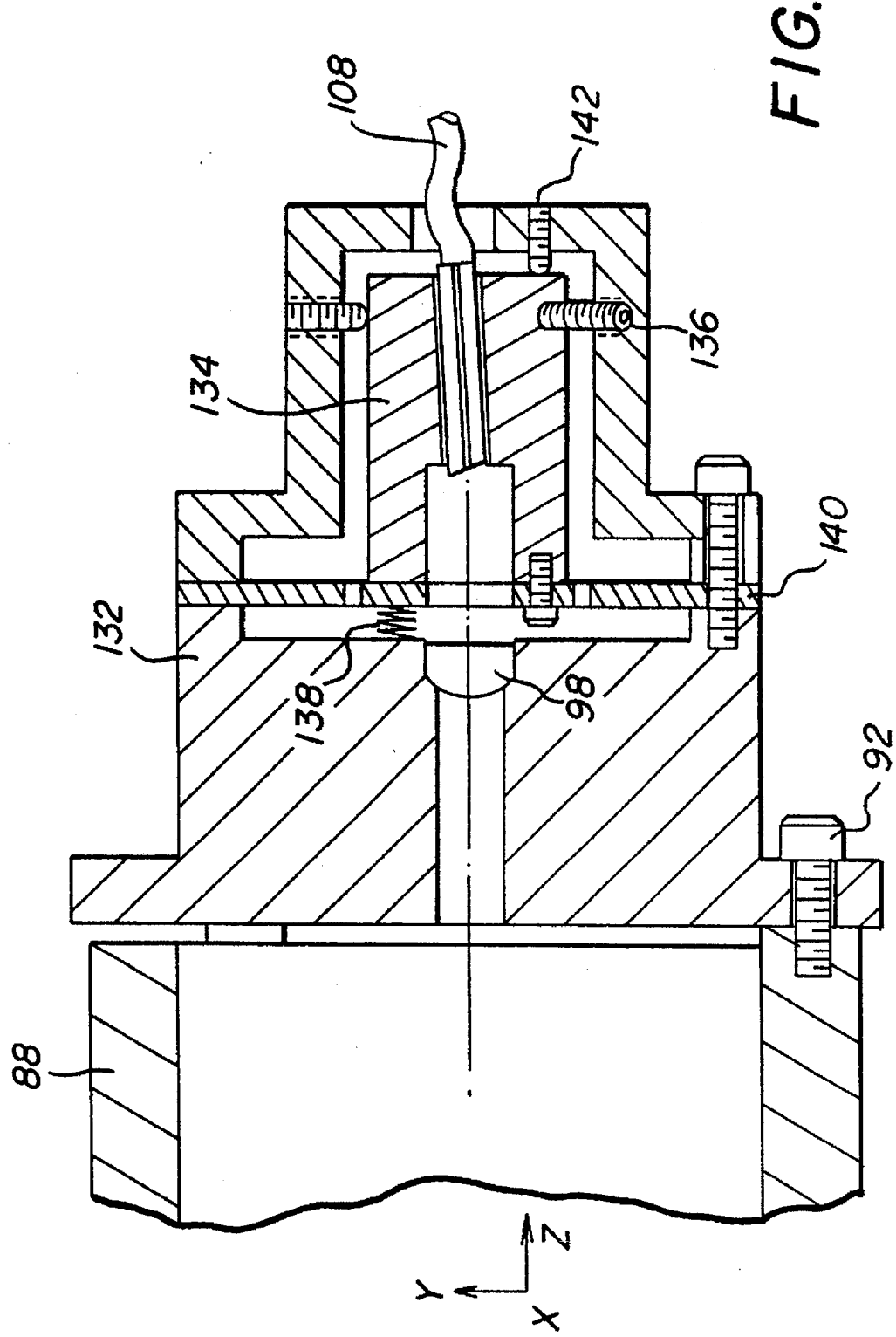

5,668,899

OPTICAL RADIATION COUPLER FOR AN OPTICAL FIBER

BACKGROUND OF THE INVENTION

1. Technical Field

The present invention relates to coupling the output of a laser diode or gas laser to an optical fiber.

2. Background Art

Light emitted from a laser diode is highly divergent and elliptical. Accordingly coupling optics, such as a spherical lens, graded index lens, or a collimating/focusing lens set, is commonly used to match the emitted light to a light-receiving device. When the light-receiving device is an optical fiber, and particularly a single-mode optical fiber, the coupling becomes very sensitive to positional misalignments between the incoming light beam, the focusing lens, and the end of the optical fiber.

U.S. Pat. No. 5,351,330 discloses an optical alignment structure for a laser diode lens and an optical fiber. The structure includes a lens holder with a plurality of adjustment screws for changing the transverse position and angular orientation of coupling optics in the optic axis to steer the beam. The disclosure also provides for adjusting the longitudinal position of the end of the optical fiber along the optic axis by loosening a threaded set screw, sliding the optical fiber to a desired position, and re-tightening the set screw. Such a system for adjusting the longitudinal position of the end of an optical fiber is not sufficiently accurate for many applications. Further, the mere act of tightening the set screw may tend to distort and de-focus the end of the optical fiber.

DISCLOSURE OF THE INVENTION

Accordingly, it is an object of the present invention to provide an optical radiation coupling into an optical fiber that maximizes the optical coupling efficiency into the fiber and that is stable during operating environmental changes.

It is another object of the present invention to provide an optical radiation coupling into an optical fiber that is simple in design and is easily manufacturable.

It is still another object of the present invention to provide an optical radiation coupling into an optical fiber that includes a flexure for sub-micron lateral alignment of the beam, and which accomplishes longitudinal focusing of the beam with respect to the fiber end by means of the same flexure.

According to a feature of the present invention, apparatus for coupling a radiation beam to an optical fiber includes an optical fiber holder, a housing, and a lens positioned in the housing. A flexure provides angular and longitudinal alignment of at least one of the lens and the optical fiber holder relative to the other of the lens and the optical fiber holder for thereby positioning and focusing of the beam on the radiation-receiving end of a received optical fiber.

According to preferred embodiments of the present invention, the flexure is a thin, flat member with a first support region fixed relative to the lens and a second support region fixed relative to the fiber holder. The first and second support regions are circular and co-axial, and the second support region has a diameter greater than the first region. The first and second support regions are connected by a plurality of flexible bridge pairs. The flexure holds the lens with three degrees of freedom of movement relative to the radiation-receiving end of the received optical fiber, including rotation about two axes plus translation along the optical path.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which:

FIG. 3 is an enlarged view showing details of the lens to fiber coupling of a laser channel subsystem;

FIG. 4 is a schematic top view of a laser channel subsystem according to the present invention;

FIG. 12 is a detailed illustration, partially in section, of apparatus according to yet another embodiment of the present invention.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
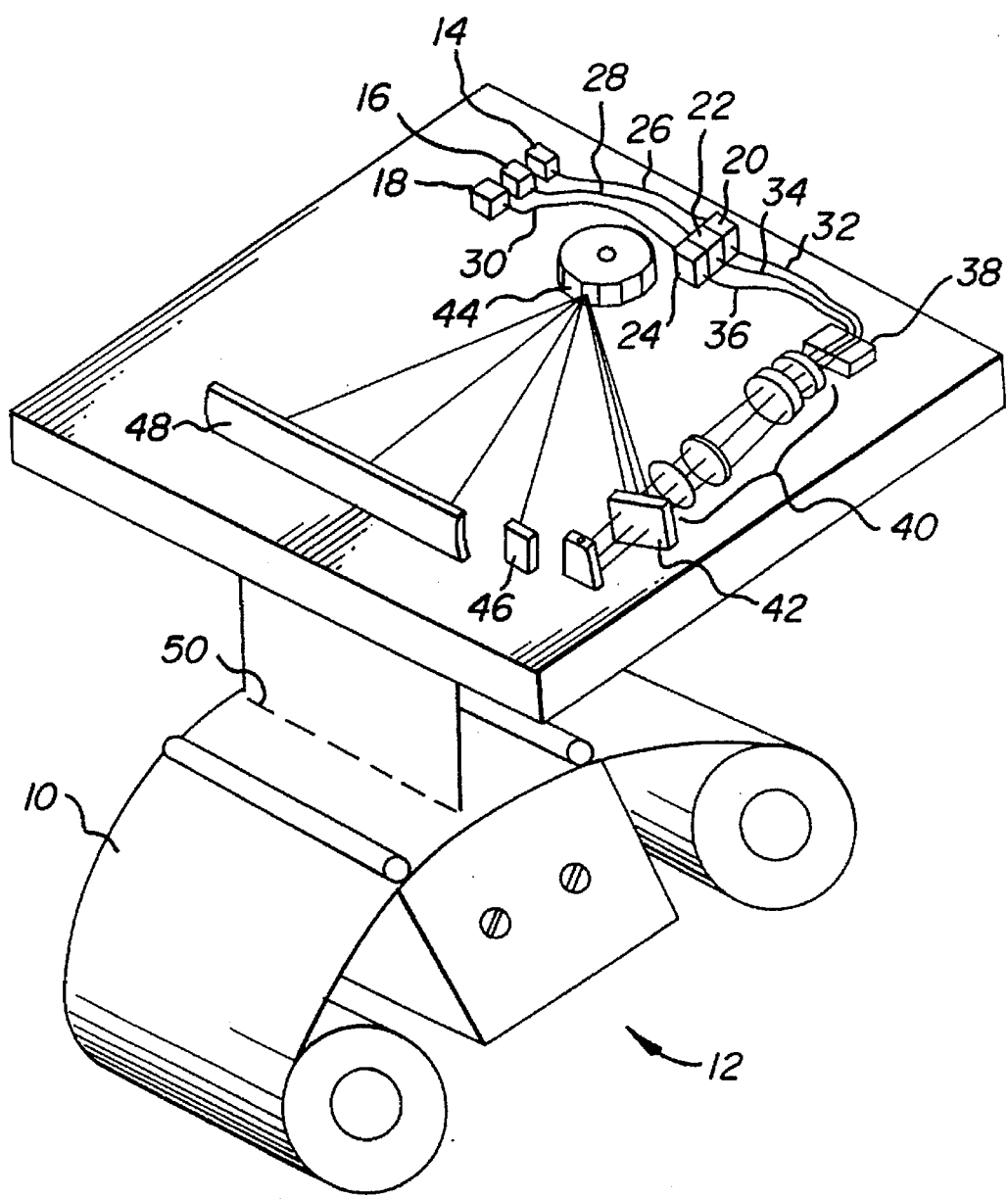
FIG. 1 is a schematic perspective view of printer in which the present invention is useful.

FIG. 1 is an example of a system in which the present invention is particularly useful. It will be understood by those skilled in the art that there are many other systems wherein the output of a laser diode or gas laser is coupled to an optical fiber, and wherein the present invention is equally applicable and advantageous.

In the illustrative laser printing system of FIG. 1, a roll of photo-sensitive media 10 such as silver halide-coated paper is advanced past a print station 12. Three lasers 14, 16, and 18 of different wavelengths, say red, green, and blue) are coupled to respective acousto-optic modulators 20, 22, and 24 by respective optical fibers 26, 28, and 30.

Light from the acousto-optic modulators are coupled into optical fibers 32, 34 and 36, which terminate at a fiber printhead 38. Light from the ends of optical fibers 32, 34, and 36 passes through a set 40 of beam-shaping optics. The shaped beams are reflected by a turning mirror 42 to a polygonal rotating mirror 44. A conventional start-of-scan detector 46 and a cylindrical mirror 48 receive light from polygonal rotating mirror 44, and the cylindrical mirror focuses the beams along a line 50 at print station 12.

There is a need to provide optically efficient and stable coupling of light from lasers 14, 16, and 18 into optical fibers 26, 28, and 30 because of the small core size of the optical fibers. Single-mode optical fiber is approximately 3.1 μm.

Figure 2:
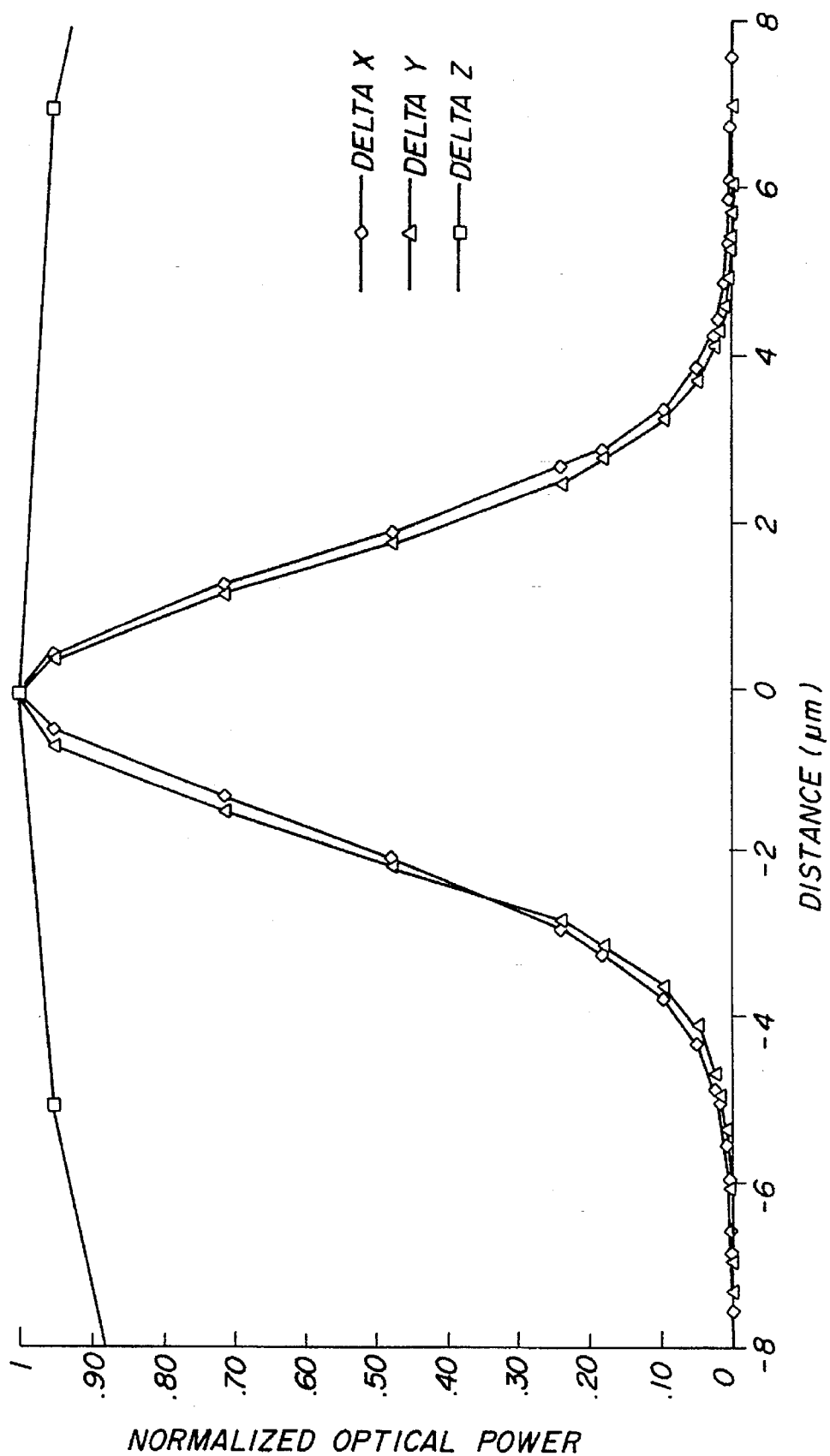
FIG. 2 illustrates the sensitivity of alignment of a single mode fiber to a lens.

FIG. 2 illustrates the sensitivity of alignment of a single mode fiber to a focusing lens as shown in FIG. 3. In the illustrations, a 3.1 μm single mode fiber was coupled to a green laser at an 8.0 degree angle polish on the fiber and with 3.75 degree $\Theta_y$ fiber inclination. Note the extremely narrow range of normalized optical power as the alignment distance changes.

Referring to FIG. 4, a laser channel subsystem in which the present invention would be useful includes a field-replaceable laser module 52 having a laser 54. A sub-module 56 includes a lens 58 and a fiber input 60. A fiber-to-fiber coupler 62 connects fiber input 60 to a fiber output 64 of a module 66 with a lens 68.

A beamsplitter 70 divides the output of lens 68, with a portion of the output being reflected to a power detector 72. The portion of the light passing through beamsplitter 70 is acoustically modulated at 74 before reaching a module 78 containing a lens 80 and a multiplexer input 82.

Figure 5:
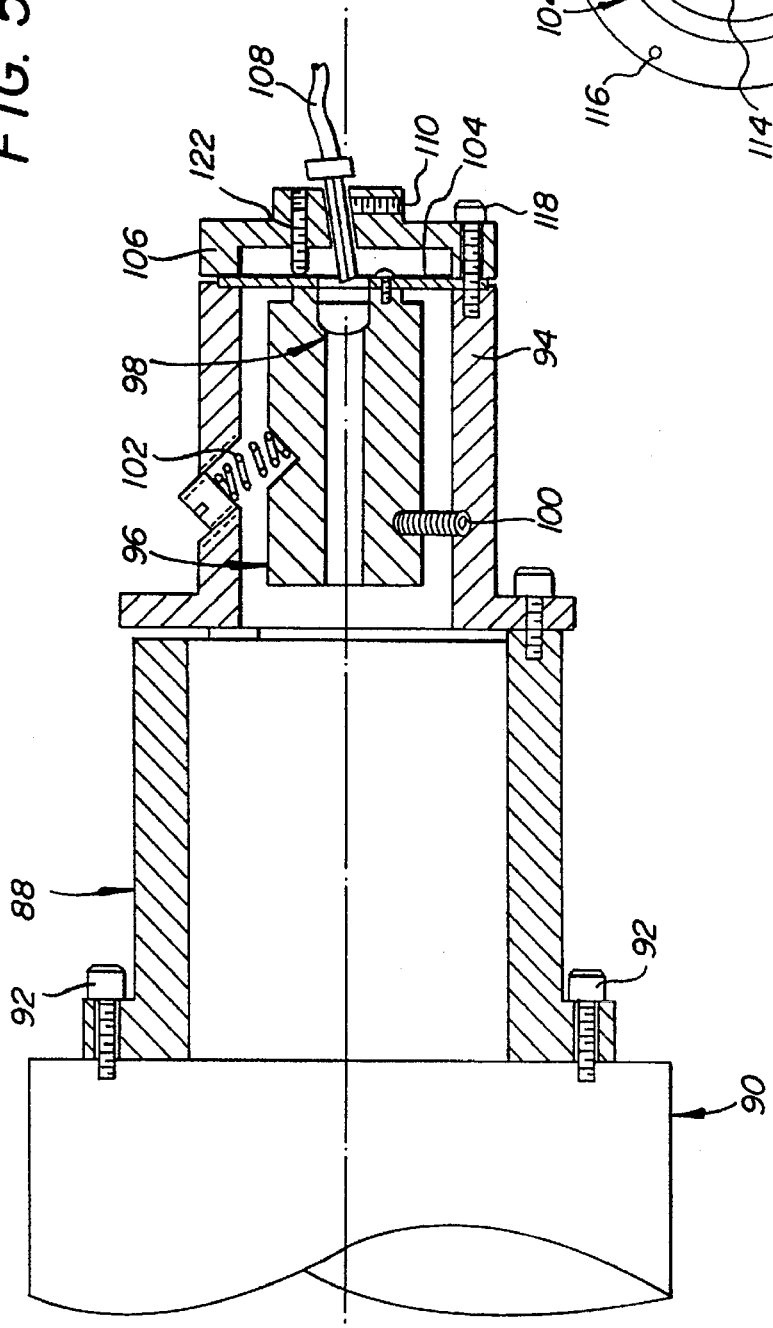
FIG. 5 is a detailed illustration, partially in section, of apparatus according to one embodiment of the present invention.

Referring to FIG. 5, a laser barrel 88 is attached to a laser housing 90 such as by several screws 92. In turn, an adjustment cylinder 94 is screwed to the laser barrel. A lens barrel 96 and associated lens 98 are adjustably held in the adjustment cylinder by a pair of adjustment screws 100 (only one screw 100 is illustrated in FIG. 5), a preload spring 102, an annular flexure 104, and a ferrule holder 106. An optical fiber 108 is held in the ferrule holder by a screw 110.

Figure 6:
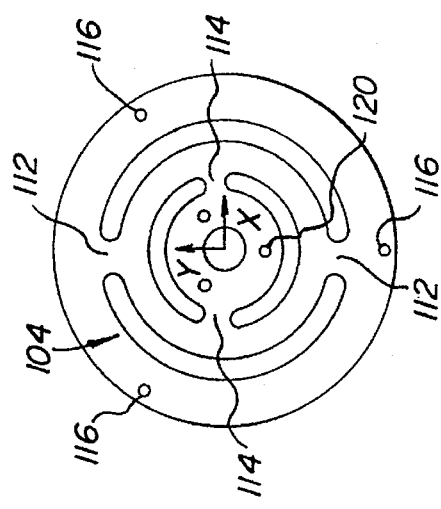
FIG. 6 is a detail view of a portion of the apparatus shown in FIG. 5.

Referring to FIG. 6, annular flexure 104 is a thin metal plate formed (such as by stamping, laser cutting, or chemical etching) with a plurality of cutouts so as to leave flexible bridge pairs 112 and 114. A plurality of holes 116 are used to attach the annular flexure to adjustment cylinder 94 by screws 118 (FIG. 5), and holes 120 are used to attach the flexure to lens barrel 96.

Figure 7:
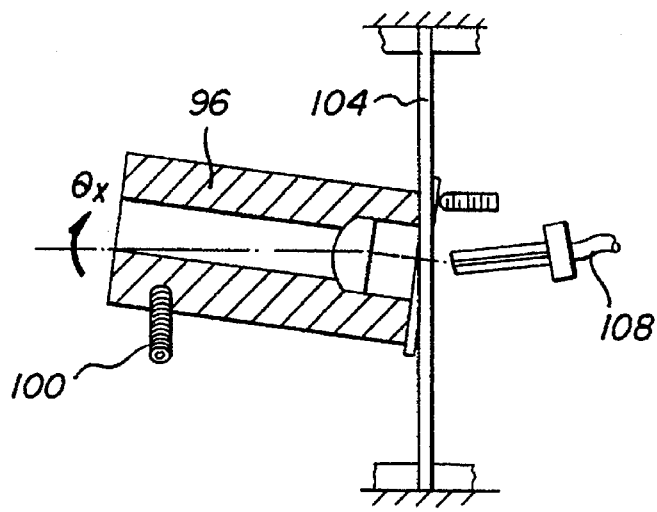
FIGS. 7 and 8 are schematic views of the operation of the apparatus shown in FIG. 5.
Figure 8:
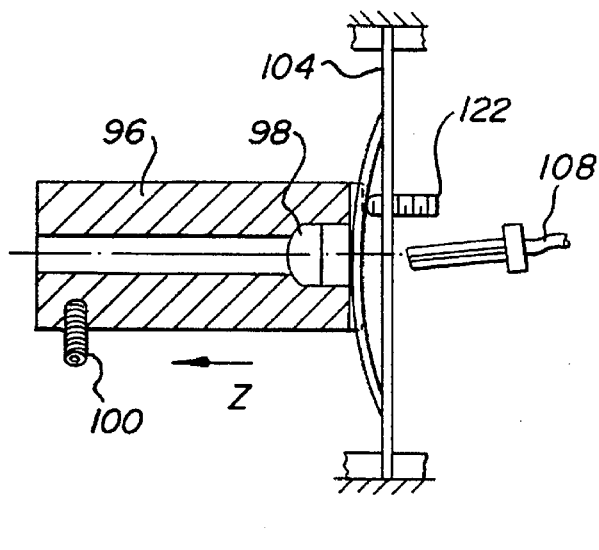

The inner portion of annular flexure 104 has three degrees of freedom relative to the outer portion of the annular flexure. Referring to FIG. 7, adjustment screws 100 can be used to pivot lens barrel 96 through an angle $\Theta_x$ by flexing bridge pair 114 (FIG. 6) and through an angle $\Theta_y$ by flexing bridge pair 112 (also FIG. 6). FIG. 8 shows that an adjustment screw 122 can be used to move the lens barrel in the z-direction along the optical axis of lens 98. Once adjustment is completed, lens barrel is held in place by preload spring 102, shown in FIG. 5.

Several alternative mounting structures will be readily designable by a skilled artisan who has benefit of the preceding disclosure. By way of examples, FIGS. 9 and 10, 11 and 12 illustrate several alternative embodiments of the present invention.

Figure 9:
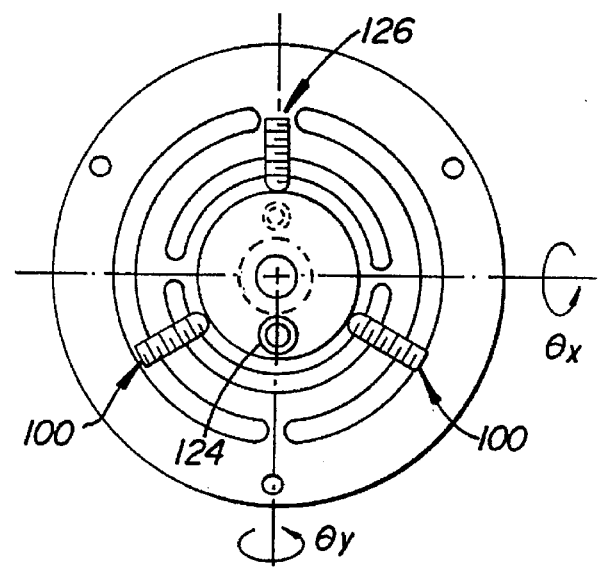
FIGS. 9 and 10 are schematic end and side views of a portion of the apparatus according to another embodiment of the present invention.
Figure 10:
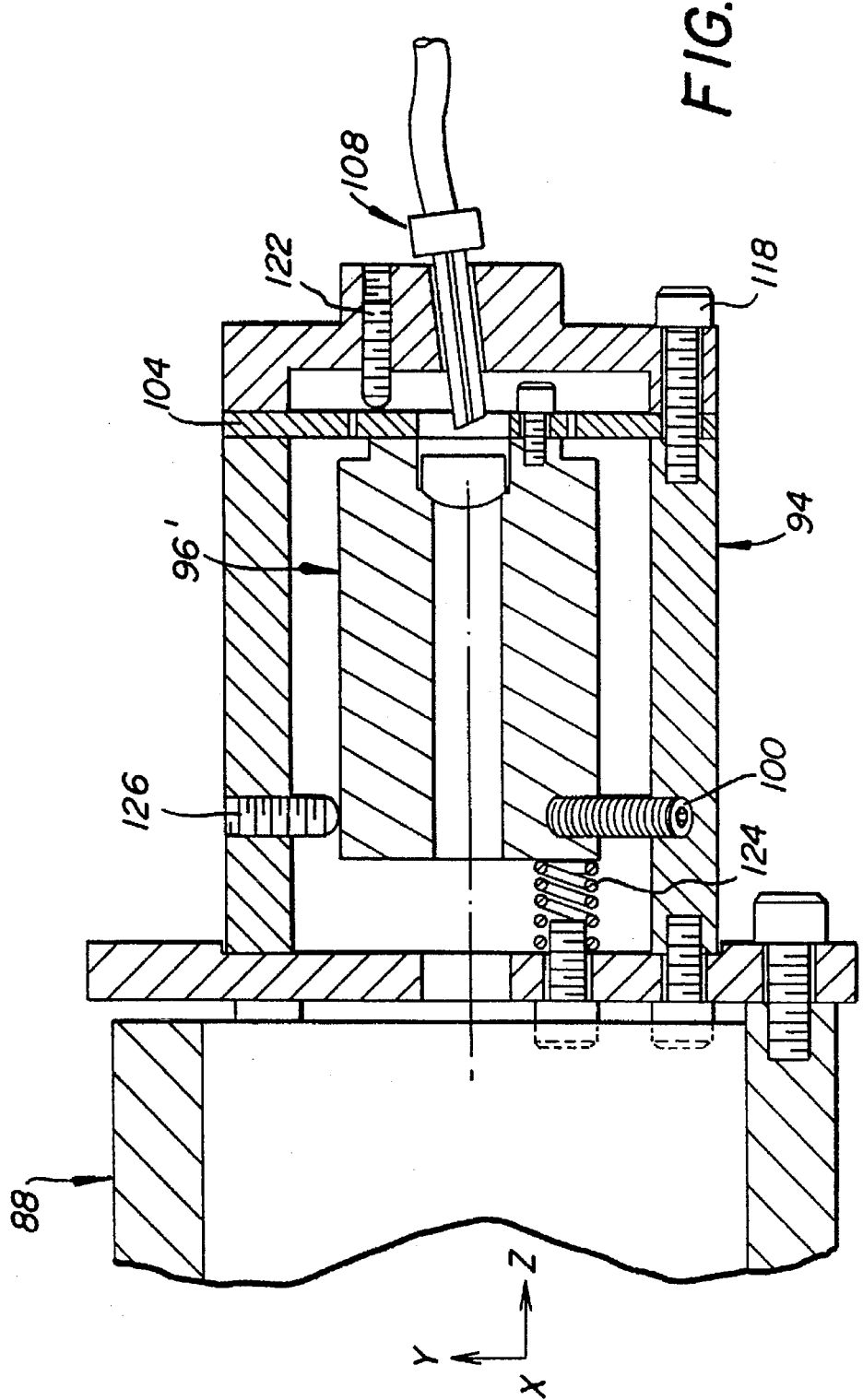

In the embodiment of the present invention illustrated in FIGS. 9 and 10, a preload spring 124 is substituted for preload spring 102 of the first embodiment, and lens barrel 96' is held in place such as by adhesive or by a lock-down screw 126.

Figure 11:
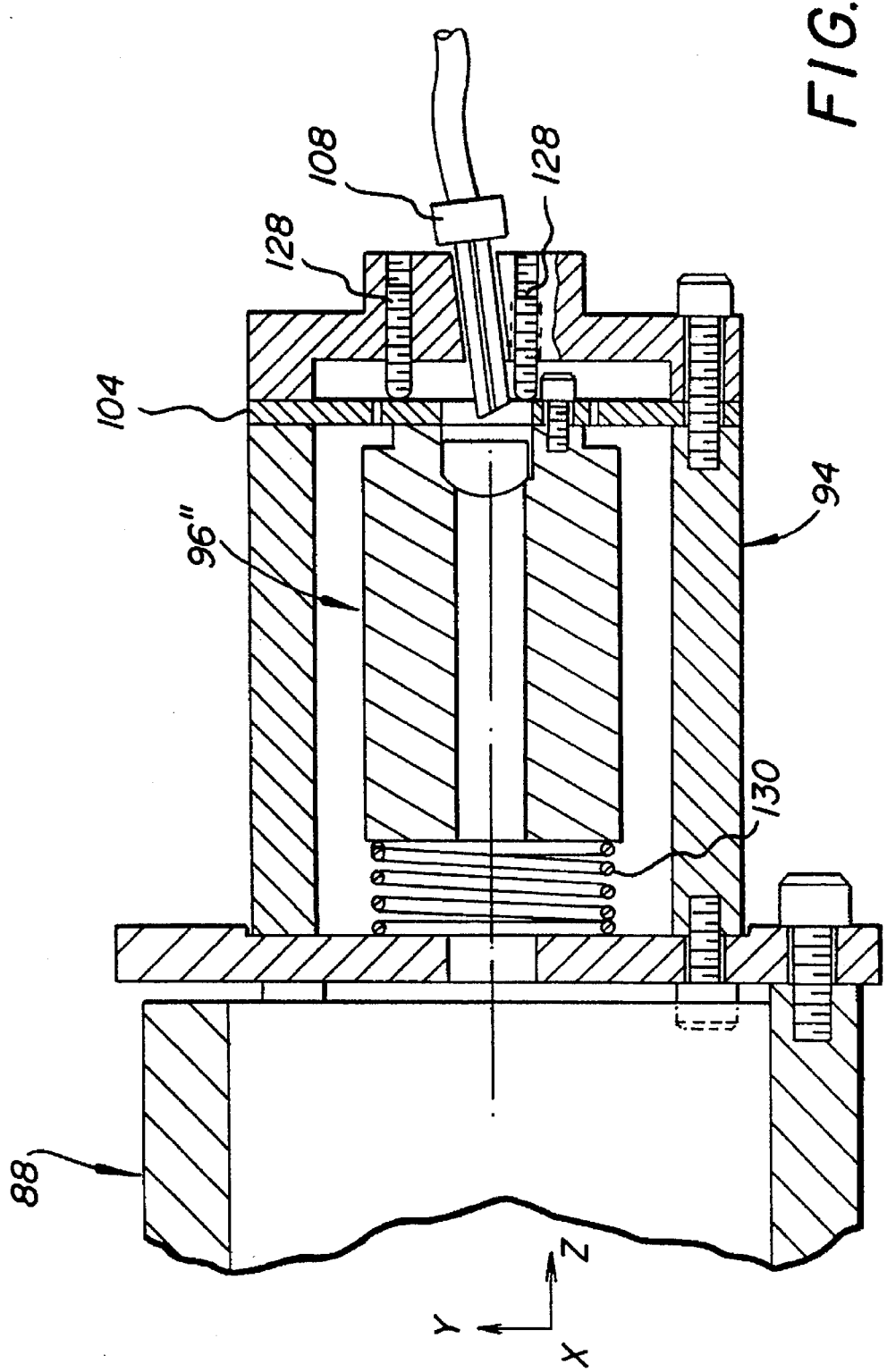
FIG. 11 is a detailed illustration, partially in section, of apparatus according to still another embodiment of the present invention.

Referring to FIG. 11, lens barrel 96" is mounted on an annular flexure 104, and is positioned by three adjustment screws 128. A preload spring 130 holds the lens barrel against the adjustment screws.

FIG. 12 is a detailed illustration, partially in section, of apparatus according to yet another embodiment of the present invention. A laser barrel 88 is attached to a laser housing, not shown, such as by several screws 92. In turn, a lens housing 132 is screwed to the laser barrel and fixedly holds a lens 98. A barrel 134 and fiber 108 are adjustably held in barrel 134 by a pair of adjustment screws 136, a preload spring 138, an annular flexure 140, and a longitudinal adjustment screw 142.

Better thermal stability of the structure can be obtained by use of low thermal expansion materials for the flexure. For example, low thermal expansion stainless steel such as 416 series stainless may be used.

From the preceding description, it can be seen that the present invention provides a relatively simple design that is easily manufacturable. Common adjustment screws can be used to provide sub-micron alignment accuracy by the nature of the mount design. Focusing of the lens on the end of the fiber is accomplished with the same annular flexure.

The invention has been described in detail with particular reference to preferred embodiments thereof, but it will be understood that variations and modifications can be effected within the spirit and scope of the invention.

What is claimed is:

1. Apparatus for coupling a radiation beam to an optical fiber, said apparatus comprising:

means for holding a received optical fiber having a radiation-receiving end;

a housing adapted to receive the radiation beam along an optical path toward the end of a received optical fiber;

a lens in the housing along the optical path to interact with the beam;

a flexure for angular and longitudinal alignment of at least one of: (i) the lens and (ii) the optical fiber holding means, relative to the other of (i) the lens and (ii) the optical fiber holding means, for positioning and focusing of the beam on the radiation-receiving end of a received optical fiber wherein the flexure holds the lens with three degrees of freedom of movement relative to the radiation-receiving end of the received optical fiber.

2. Apparatus as set forth in claim 1 wherein said flexure is adapted to provide for angular and longitudinal alignment of the lens relative to the optical fiber holding means.

3. Apparatus as set forth in claim 1 wherein said flexure is adapted to provide for angular and longitudinal alignment of the optical fiber holding means relative to the lens.

4. Apparatus as set forth in claim 1 wherein the flexure comprises a thin, flat member with a first support region fixed relative to the lens and a second support region fixed relative to the fiber holding means.

5. Apparatus as set forth in claim 4 wherein the first and second support regions are circular and co-axial.

6. Apparatus as set forth in claim 5 wherein the second support region has a diameter greater than the first region.

7. Apparatus as set forth in claim 4 wherein the first and second support regions are connected by a plurality of flexible bridges.

8. Apparatus as set forth in claim 4 wherein the first and second support regions are connected by a plurality of flexible bridge pairs.

9. Apparatus as set forth in claim 1 wherein the degrees of freedom include rotation about two axes.

10. Apparatus as set forth in claim 9 wherein the degrees of freedom include translation along the optical path.

11. Apparatus as set forth in claim 1 wherein the flexure is formed of low thermal expansion material.

12. Apparatus as set forth in claim 1 wherein the flexure is formed of low thermal expansion stainless steel.

\* \* \* \* \*